B. G. LAMME.
ELECTRICAL EQUALIZER SYSTEM.
APPLICATION FILED NOV. 30, 1908.
925,357.
Patented June 15, 1909.
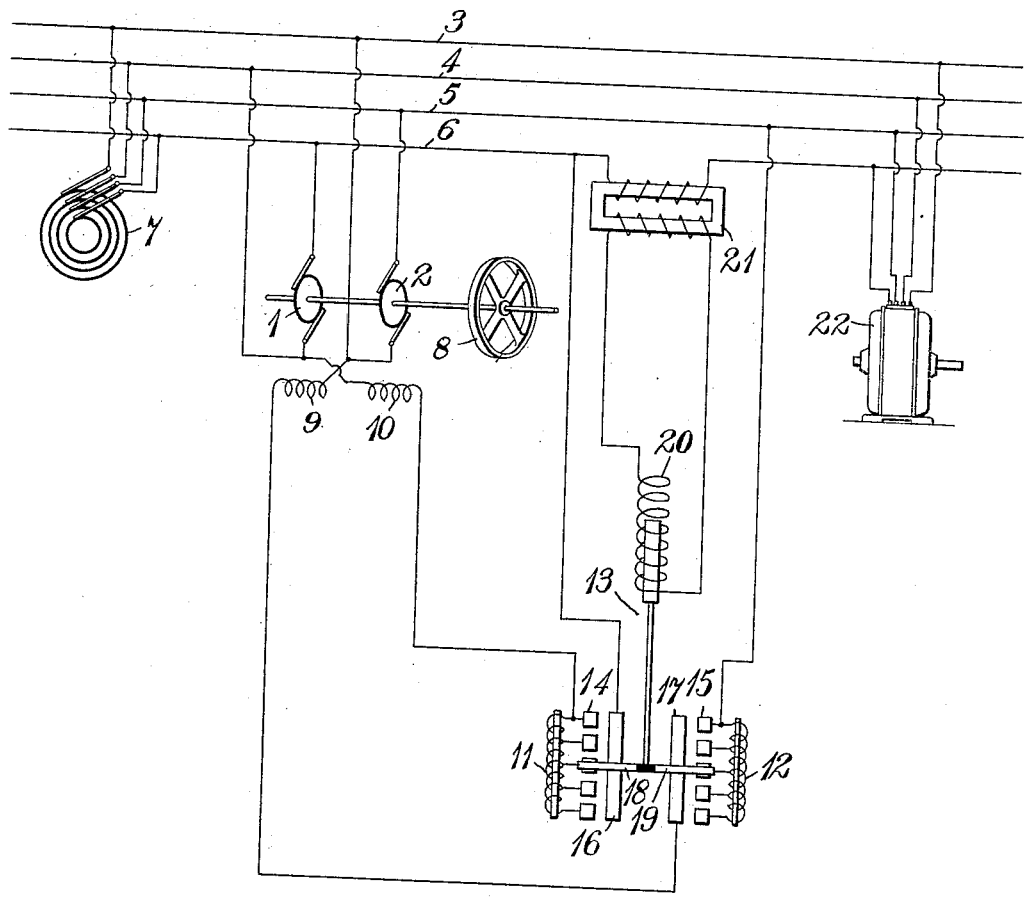
WITNESSES:
Fred H Miller
Otto S Schairer
INVENTOR
Benjamin G. Lamme
BY
Wesley G Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL EQUALIZER SYSTEM.

No. 925,357.     Specification of Letters Patent.     Patented June 15, 1909.

Original application filed September 3, 1907, Serial No. 391,214. Divided and this application filed November 30, 1908. Serial No. 465,328.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electrical Equalizer Systems, of which the following is a specification, this application being a division of my application, Serial No. 391,214, filed September 3, 1907, allowed November 18, 1908.

My invention relates to systems of electrical distribution, and particularly to means for equalizing the load upon the generator or supply station when the load upon the system is variable.

The object of my invention is to provide simple and effective means that may be employed in connection with the polyphase alternating current systems of distribution for absorbing or yielding energy in accordance with variations in load upon the system, in such a manner that the load upon the generating or supply station of the system may remain substantially constant or may not exceed a predetermined value.

It has heretofore been proposed to employ fly-wheels or other devices having considerable inertia in systems of distribution that supply translating devices requiring widely varying amounts of power, and to so drive the fly-wheels and control their operation that the load upon the distributing circuit will remain substantially constant, regardless of the variations in the amount of power required by the translating devices.

In the present system, a dynamo-electric machine, that may operate either as a motor or as a generator and to which a fly-wheel is mechanically coupled, is directly connected to the distributing circuit without the intervention of a rotary converter or other similar device, and the arrangement is such that but comparatively small and inexpensive machines need be provided and only a single equalizer set is necessary for equalizing the load provided by a plurality of translating devices.

In carrying the invention into effect, a plurality of mechanically coupled dynamo-electric machines of the commutator type, one for each phase of the system of distribution, are employed, a fly-wheel or other parts having considerable inertia being also coupled to the said machines. The armatures of the machines are connected, respectively, to the various phases of the distributing circuit and the field magnet windings are connected to phases of the circuit other than those to which the corresponding armatures are connected, in order that the generated and counter electromotive forces of the armatures may be nearly of the same phases as the electromotive forces of the circuits to which they are connected.

The machines are caused to operate alternately as motors and generators by adjusting their field strengths, or by otherwise adjusting the ratio of the electromotive forces, respectively of the distributing circuit and of the armatures of the machines, in accordance with the variations in the load afforded by the translating devices, energy being stored in the fly-wheel when operating the machines as motors and yielded for operating the machines as generators to supply current to the system.

In the single figure of the accompanying drawing, armatures 1 and 2 of two dynamo-electric machines of the commutator type of construction are connected, respectively, to the different phases of a two-phase distributing circuit 3—4—5—6 that may be supplied from a generator 7, or from any other suitable source, the armatures being either provided with large masses or coupled to a fly-wheel 8 whereby the rotatable system is provided with considerable inertia. Field magnet windings 9 and 10 of the dynamo-electric machines are connected to other phases of the distributing circuit 3—4—5—6 than those to which the corresponding armatures are connected, variable impedance devices 11 and 12 being included in circuit therewith. The active lengths of the impedance devices 11 and 12 are adjusted by means of a controller 13 comprising two sets of stationary contact terminals 14 and 15 that are severally connected to the points of subdivision of the impedance devices. The controller 13 comprises, further, two contact strips 16 and 17 that are disposed adjacent to the respective sets of contact terminals, and two movable conducting segments 18 and 19 that are movable over the contact terminals and strips and are actuated by means of an electro-magnet winding 20 to which current is supplied proportional in amount to that traversing a distributing circuit by means of a series transformer 21. Thus, the positions of the movable conducting segments 18 and 19 with respect to the stationary contact terminals and strips, and also the amounts of impedance included in circuit with the field magnet windings of the dynamo-electric machines, are dependent upon the amounts of current required of the distributing circuit by a suitable load, such, for example, as an induction motor 22.

Since the field magnet windings of the dynamo-electric machines are associated with different phases of the distributing circuit than those to which the corresponding armatures are connected, the counter and generated electromotive forces in the armatures will agree approximately in phase with the electromotive forces of the circuit conductors to which they are connected. In order that the said phase relations may not be materially disturbed, in effecting regulation of the field strength, it will usually be found desirable, though not necessary, that the power factors of the said devices be substantially the same as the power factors of the field magnet windings.

If, in the operation of the system, the current required of the distributing circuit by the load 22 is less than a predetermined amount, the movable conducting segments 18 and 19 of the controller will occupy such positions that considerable amounts of the impedance afforded by the devices 11 and 12 will be included in circuit with the field magnet windings. The field magnet strengths will be thereby so reduced that the counter electromotive forces in the armatures will become less than the electromotive forces of the conductors to which the armatures are connected, and the machines will, therefore, be caused to operate as motors so as to store energy in the fly-wheel 8 and in the remainder of the rotatable system. If the load increases, the amounts of impedance included in the field circuits will be decreased and the field strengths will be correspondingly increased. The energy previously stored in the rotatable system, including the fly-wheel, is then yielded to operate the machines as generators of greater electromotive forces than the electromotive forces of the circuit conductors to which the armatures are connected. Thus, by adjusting the field strengths of the machines in accordance with variations in the amount of current required of the distributing circuit, the ratio of the electromotive forces, respectively, of the distributing circuit and of the armatures is adjusted, and the machines are caused to operate as motors when the said current is less than a predetermined amount and as generators when the said current is greater than the predetermined amount.

I claim as my invention:

1. The combination with a two-phase alternating current distributing circuit, and two mechanically coupled dynamo-electric machines each having its armature associated with one pair of conductors of said circuit and its field magnet winding associated with the other pair of conductors, similar windings being associated with different pairs of conductors, of means for adjusting the field strengths of the machines to cause them to operate as motors when the current required from the distributing circuit is less than a predetermined amount, and as generators when the said current exceeds the predetermined amount.

2. The combination with a two-phase alternating current distributing circuit, and two mechanically coupled dynamo-electric machines, each having its armature associated with one pair of conductors of said circuit and its field magnet winding associated with the other pair of conductors, similar windings being associated with different pairs of conductors, of means for adjusting the field strengths of the machines in accordance with variations in the amount of current required of the distributing circuit.

3. The combination with a two-phase alternating current distributing circuit, of two mechanically coupled dynamo-electric machines, each having its armature associated with one pair of conductors of said circuit and its field magnet winding associated with the other pair of conductors, similar windings being associated with different pairs of conductors.

4. The combination with a two-phase alternating current distributing circuit and two mechanically coupled dynamo-electric machines, each having its armature associated with one pair of conductors of said circuit and its field magnet winding associated with a different pair of conductors, of means for effecting adjustment of the ratio of respective electromotive forces of the distributing circuit and of the armatures of the machines.

In testimony whereof, I have hereunto subscribed my name this 27th day of November, 1908.

BENJ. G. LAMME.

Witnesses:
E. LIVINGSTONE,
BIRNEY HINES.